United States Patent
Glaess et al.

(10) Patent No.: US 12,475,918 B2
(45) Date of Patent: Nov. 18, 2025

(54) HARD DISK DRIVE GIMBAL DESIGN WITH HIGH YAW MODE

(71) Applicant: Magnecomp Corporation, Murrieta, CA (US)

(72) Inventors: David Glaess, Bangkok (TH); Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/196,919

(22) Filed: May 12, 2023

(65) Prior Publication Data
US 2023/0282229 A1   Sep. 7, 2023

Related U.S. Application Data

(62) Division of application No. 17/673,683, filed on Feb. 16, 2022, now Pat. No. 11,688,421.

(60) Provisional application No. 63/150,484, filed on Feb. 17, 2021.

(51) Int. Cl.
*G11B 5/48* (2006.01)
(52) U.S. Cl.
CPC ............ *G11B 5/4826* (2013.01); *G11B 5/483* (2015.09); *G11B 5/4833* (2013.01)
(58) Field of Classification Search
None
See application file for complete search history.

(56) References Cited

U.S. PATENT DOCUMENTS

| | | | |
|---|---|---|---|
| 6,011,671 A | 1/2000 | Masse et al. |
| 6,515,832 B1 | 2/2003 | Girard |
| 7,567,410 B1 | 7/2009 | Zhang et al. |
| 7,898,772 B1 | 3/2011 | Ziaei et al. |
| 8,085,506 B1 | 12/2011 | Ee et al. |
| 8,089,731 B1 | 1/2012 | Ma et al. |
| 8,130,470 B2 | 3/2012 | Muraki et al. |
| 8,208,224 B1 | 6/2012 | Teo et al. |
| 8,310,790 B1 | 11/2012 | Fanslau, Jr. |
| 8,441,761 B1 | 5/2013 | Hahn et al. |
| 8,446,695 B1 | 5/2013 | Ee et al. |
| 8,792,212 B1 | 7/2014 | Pan et al. |
| 8,792,213 B1 | 7/2014 | Vijay et al. |
| 8,879,210 B1 | 11/2014 | Hahn et al. |
| 8,947,831 B1 | 2/2015 | Ee et al. |
| 8,964,334 B2 | 2/2015 | Takikawa et al. |

(Continued)

OTHER PUBLICATIONS

Office Action in U.S. Appl. No. 18/207,764, dated Dec. 13, 2023.

(Continued)

*Primary Examiner* — Craig A. Renner
(74) *Attorney, Agent, or Firm* — DLA Piper LLP (US)

(57) ABSTRACT

A trace gimbal is described herein. In some embodiments, the trace gimbal includes outer struts including a front outrigger at a distal end of the trace gimbal and a rear outrigger at a proximal end of the trace gimbal. The front outrigger includes a distal front outrigger and a proximal front outrigger, and the rear outrigger includes a distal rear outrigger and a proximal rear outrigger. The trace gimbal further includes a middle strut extending in a width direction of the trace gimbal and adjoining the proximal front outrigger to the rear outrigger, and an inner strut connecting the middle strut to a slider tongue. The inner strut includes a slot, and the inner strut and the middle strut adjoin the outer gimbal struts to the slider tongue.

14 Claims, 9 Drawing Sheets

(56) References Cited

U.S. PATENT DOCUMENTS

| | | |
|---|---|---|
| 8,976,491 B1 | 3/2015 | Chen et al. |
| 9,190,086 B1 | 11/2015 | Ee et al. |
| 9,558,768 B1 | 1/2017 | Tsuchiya et al. |
| 10,748,565 B1 | 8/2020 | Nakayama et al. |
| 10,783,909 B1 | 9/2020 | Tiller et al. |
| 10,991,388 B1 | 4/2021 | Yamada |
| 11,043,236 B1 | 6/2021 | Pallay |
| 11,176,961 B2 | 11/2021 | Suzuki et al. |
| 11,289,120 B1 | 3/2022 | Pallay |
| 11,308,982 B1 | 4/2022 | Pallay |
| 11,688,421 B2 | 6/2023 | Glaess et al. |
| 11,715,490 B2 | 8/2023 | Ee et al. |
| 11,900,974 B2 | 2/2024 | Kotchaplayuk et al. |
| 2007/0188927 A1 | 8/2007 | Zhu et al. |
| 2007/0223143 A1 | 9/2007 | Matsui et al. |
| 2008/0144223 A1 | 6/2008 | Muraki et al. |
| 2008/0278858 A1 | 11/2008 | Ishii et al. |
| 2010/0238581 A1 | 9/2010 | Nakamura et al. |
| 2011/0090600 A1 | 4/2011 | Feng |
| 2011/0096438 A1 | 4/2011 | Takada et al. |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0085755 A1 | 3/2014 | Hanya et al. |
| 2014/0168813 A1 | 6/2014 | Tao et al. |
| 2015/0055253 A1 | 2/2015 | Takikawa et al. |
| 2018/0144767 A1 | 5/2018 | Ee |
| 2018/0286457 A1 | 10/2018 | Teramoto et al. |
| 2019/0066720 A1 | 2/2019 | Yamada et al. |
| 2020/0265866 A1 | 8/2020 | Suzuki |
| 2020/0279579 A1 | 9/2020 | Nakayama et al. |
| 2021/0151073 A1 | 5/2021 | Yamada |
| 2021/0225394 A1 | 7/2021 | Suzuki et al. |
| 2021/0241791 A1 | 8/2021 | Pankaew et al. |
| 2021/0241802 A1 | 8/2021 | Nakayama et al. |
| 2021/0280209 A1 | 9/2021 | Suzuki et al. |
| 2021/0287698 A1 | 9/2021 | Yamada |
| 2021/0390979 A1 | 12/2021 | Ee et al. |
| 2022/0122633 A1 | 4/2022 | Zhang et al. |
| 2023/0128010 A1 | 4/2023 | Phu et al. |
| 2023/0317104 A1 | 10/2023 | Ee et al. |
| 2024/0029760 A1 | 1/2024 | Zhang et al. |

OTHER PUBLICATIONS

Office Action in U.S. Appl. No. 18/207,764, dated Apr. 12, 2024.
International Preliminary Report on Patentability in International Application No. PCT/US2022/016859, mailed Aug. 31, 2023.
International Preliminary Report on Patentability in International Application No. PCT/US2022/022056, mailed Oct. 5, 2023.
Office Action in U.S. Appl. No. 18/207,764, dated Jul. 16, 2024.
International Search Report and Written Opinion in International Application No. PCT/US2021/055690, mailed Jan. 28, 2022.
International Preliminary Report on Patentability in International Application No. PCT/US2021/055690, mailed May 4, 2023.
International Search Report and Written Opinion in International Application No. PCT/US2022/016859, dated Jun. 10, 2022.
International Search Report and Written Opinion in International Application No. PCT/US2022/022056, dated Jun. 7, 2022.
Office Action in U.S. Appl. No. 17/504,187, dated Apr. 26, 2022.
Office Action in U.S. Appl. No. 17/504,187, dated Oct. 5, 2022.
Office Action in U.S. Appl. No. 17/504,187, dated Mar. 7, 2023.
Notice of Allowance in U.S. Appl. No. 17/504,187, dated Jul. 6, 2023.
Office Action in U.S. Appl. No. 17/673,683, dated Aug. 16, 2022.
Notice of Allowance in U.S. Appl. No. 17/673,683, dated Feb. 13, 2023.
Office Action in U.S. Appl. No. 17/703,827, dated May 27, 2022.
Office Action in U.S. Appl. No. 17/703,827, dated Jul. 21, 2022.
Office Action in U.S. Appl. No. 17/703,827, dated Oct. 13, 2022.
Notice of Allowance in U.S. Appl. No. 17/703,827, dated Mar. 10, 2023.

|  | baseline | FIG. 6 | FIG. 7 | FIG. 8 |
|---|---|---|---|---|
| kp (uNm/deg) | 0.41 | 0.58 | 0.48 | 0.50 |
| Kr (uNm/deg) | 0.66 | 0.72 | 0.71 | 0.71 |
| Yaw (kHz) | 62.4 | 76.8 | 67.8 | 68.5 |

FIG. 9

HARD DISK DRIVE GIMBAL DESIGN WITH HIGH YAW MODE

CROSS-REFERENCE TO RELATED APPLICATIONS

This application is a divisional of U.S. application Ser. No. 17/673,683 filed on Feb. 16, 2022, which claims the benefit of, and priority to, U.S. Provisional Application No. 63/150,484 filed on Feb. 17, 2021, which is hereby incorporated by reference in its entirety.

FIELD

This disclosure relates to the field of suspensions for hard disk drives. More particularly, this disclosure relates to the field of gimbal struts on an actuated suspension.

BACKGROUND

In a dynamic disk storage device, a rotating disk is employed to store information. Disk storage devices typically include a frame to provide attachment points and orientation for other components, and a spindle motor mounted to the frame for rotating the disk. A read/write head is formed on a head slider for writing and reading data to and from the disk surface. The head slider is supported and properly oriented in relationship to the disk by a suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the suspension, thus positioning the head slider at a desired height and alignment above the disk which is referred to as the fly height.

Suspensions for disk drives include a load beam and a flexure. The load beam typically includes a mounting region for mounting the suspension to an actuator of the disk drive, a rigid region, and a spring region between the mounting region and the rigid region. The spring region provides a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of another or secondary actuator or actuators, such as a piezoelectric, electrostatic or electromagnetic actuator or fine tracking motor, mounted on the head suspension itself. These types of actuators are also known as dual-stage microactuation devices and may be located at the base plate, the load beam or on the flexure.

Some of these attempts to improve tracking and head slider positioning control have included locating the actuators both at the base plate and on the flexure tongue simultaneously. Typically, this type of suspension uses voice coil and the actuator located at the base plate region for a large motion of the read/write head, while uses the actuator located on the flexure tongue for a desired fine movement to position the read/write head over the tracks of the disk drive.

SUMMARY

A trace gimbal is described herein. According to some embodiments of the present disclosure, the trace gimbal includes outer struts including a front outrigger at a distal end of the trace gimbal and a rear outrigger at a proximal end of the trace gimbal. The front outrigger includes a distal front outrigger and a proximal front outrigger, and the rear outrigger includes a distal rear outrigger and a proximal rear outrigger. The trace gimbal further includes a middle strut extending in a width direction of the trace gimbal and adjoining the proximal front outrigger to the rear outrigger, and an inner strut connecting the middle strut to a slider tongue. The inner strut includes a slot, and the inner strut and the middle strut adjoin the outer gimbal struts to the slider tongue.

According to some embodiments of the present disclosure, the trace gimbal further comprises at least one microactuator mounted on the slider tongue, wherein the inner strut supports the slider tongue.

According to some embodiments of the present disclosure, the proximal front outrigger includes a first cross-section and distal front outrigger includes a second cross-section, wherein a width of the second cross-section width is about a same dimension as the first cross-section of the proximal front outrigger.

According to some embodiments of the present disclosure, the first cross-section and the second cross-section of the front outrigger is between 0.05 mm and 0.10 mm.

According to some embodiments of the present disclosure, the distal rear outrigger includes a first cross-section and the proximal rear outrigger includes a second cross-section larger than the first cross-section.

According to some embodiments of the present disclosure, the first cross-section of the distal rear outrigger is between 0.10 mm and 0.20 mm.

According to some embodiments of the present disclosure, the inner strut includes a distal end and a proximal end, a distal end of the middle strut connects to the distal end of the inner strut, and the proximal end of the inner strut connects to the slider tongue.

According to some embodiments of the present disclosure, the inner strut generally extends from the distal end of the middle strut toward a proximal end of the trace gimbal to connect to the slider tongue.

According to some embodiments of the present disclosure, the slot is in a central portion of the inner strut.

According to some embodiments of the present disclosure, a cross section of the central portion including the slot is larger than a cross section of the proximal end and a cross section of the distal end of the inner strut.

A suspension comprising the trace gimbal according to some embodiments of the present disclosure is also provided.

According to some embodiments of the present disclosure, the trace gimbal further comprises at least one microactuator mounted on the slider tongue, wherein the inner strut supports the slider tongue.

According to some embodiments of the present disclosure, the proximal front outrigger includes a first cross-section and distal front outrigger includes a second cross-section, wherein a width of the second cross-section width is about a same dimension as the first cross-section of the proximal front outrigger.

According to some embodiments of the present disclosure, the first cross-section and the second cross-section of the front outrigger is between 0.05 mm and 0.10 mm.

According to some embodiments of the present disclosure, the distal rear outrigger includes a first cross-section and the proximal rear outrigger includes a second cross-section larger than the first cross-section.

According to some embodiments of the present disclosure, the first cross-section of the distal rear outrigger is between 0.10 mm and 0.20 mm.

According to some embodiments of the present disclosure, the inner strut includes a distal end and a proximal end, a distal end of the middle strut connects to the distal end of the inner strut, and the proximal end of the inner strut connects to the slider tongue.

According to some embodiments of the present disclosure, the inner strut generally extends from the distal end of the middle strut toward a proximal end of the trace gimbal to connect to the slider tongue.

According to some embodiments of the present disclosure, the slot is in a central portion of the inner strut.

According to some embodiments of the present disclosure, a cross section of the central portion including the slot is larger than a cross section of the proximal end and a cross section of the distal end of the inner strut.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

FIG. 9 illustrates a comparison of the yaw frequency and roll stiffness of a gimbal having the wider inner struts according to the additional embodiments of the present disclosure.

DETAILED DESCRIPTION

Figure 1:
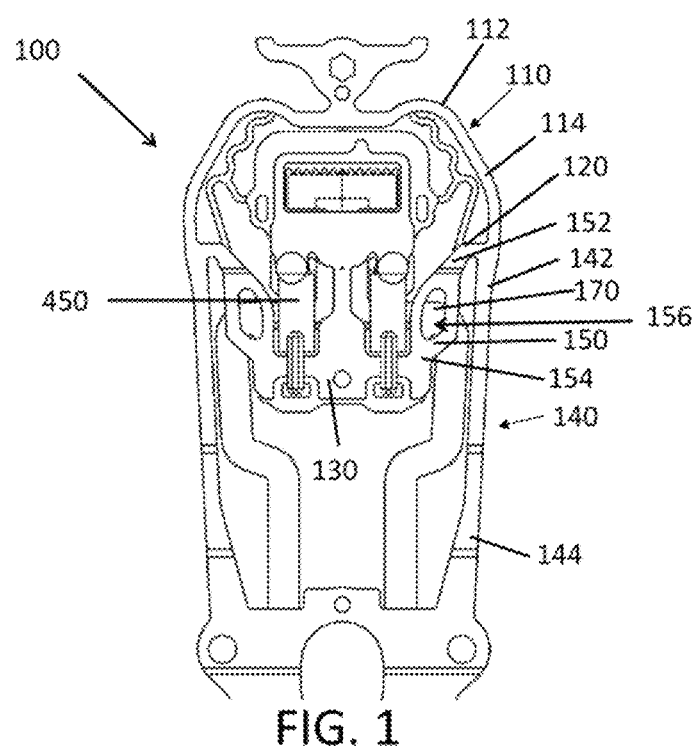
FIG. 1 illustrates a gimbal assembly of a suspension according to some embodiments of the present disclosure.

An improved trace gimbal is described herein. The improved trace gimbal according to some embodiments of the present disclosure is part of suspension for a magnetic disk drive unit. The disk drive unit includes a spinning magnetic disk, which contains a pattern of magnetic ones and zeroes on it that constitutes the data stored on the disk drive. The magnetic disk is driven by a drive motor. The disk drive unit, according to some embodiments, includes a suspension with a load beam, a base plate, and a trace gimbal to which a magnetic head slider is mounted proximate the distal end of the trace gimbal. The proximal end of a suspension or load beam is the end that is supported, i.e., the end nearest to a base plate which is swaged or otherwise mounted to an actuator arm. The distal end of a suspension or load beam is the end that is opposite the proximal end, i.e., the distal end is the cantilevered end.

The trace gimbal is coupled to a base plate, which in turn is coupled to a voice coil motor. The voice coil motor is configured to move the suspension arcuately in order to position the head slider over the correct data track on the magnetic disk. The head slider is carried on a gimbal, which allows the slider to pitch and roll so that it follows the proper data track on the spinning magnetic disk, allowing for such variations without degraded performance. Such variations typically include vibrations of the disk, inertial events such as bumping, and irregularities in the disk's surface.

In some embodiments, the trace gimbal described herein is part of a dual stage actuation (DSA) suspension. The DSA suspension can include a base plate and a load beam. The load beam includes a trace gimbal. The trace gimbal can include mounted actuators and a gimbal assembly. The actuators are operable to act directly on the gimbaled assembly of the DSA suspension that is configured to include the read/write head slider.

In some embodiments, the trace gimbal can include at least one actuator joint configured to receive an actuator. The trace gimbal, according to some embodiments, includes two actuator joints, located on opposing sides of the trace gimbal. Each actuator joint includes actuator mounting shelves.

In some embodiments, each actuator spans the respective gap in the actuator joint. The actuators are affixed to the slider tongue by an adhesive. The adhesive can include conductive or non-conductive epoxy strategically applied at each end of the actuators. The positive and negative electrical connections can be made from the actuators to the trace gimbal by a variety of techniques. When the actuator is activated, it expands or contracts producing movements of the read/write head that is mounted at the distal end of suspension thereby changing the length of the gap between the mounting ends.

In some embodiments, the suspension can be configured as a single-stage actuation suspension, a dual-stage actuation device, a tri-stage actuation device or other configurations. In some embodiments, the tri-stage actuation suspension includes actuators respectively located at the mount plate region and on the trace gimbal at the same time. Conceivably, any variation of actuators can be incorporated onto the suspension for the purposes of the examples disclosed herein. In other words, the suspension may include more or less components than those shown without departing from the scope of the present disclosure. The components shown, however, are sufficient to disclose an illustrative example for practicing the disclosed principles.

FIG. 1 illustrates a trace gimbal 100, according to some embodiments of the present disclosure. The trace gimbal 100 include at least one microactuator 450 mounted on a slider tongue 130. The trace gimbal 100 includes outer gimbal struts. The outer gimbal struts include a front outrigger 110 at a distal end of the trace gimbal 100. In some embodiments, the front outrigger includes a proximal front outrigger 114 and a distal front outrigger 112. In some embodiments, the distal front outrigger 112 and the proximal front outrigger 114 are defined by a bend or non-linear feature of the front outrigger 110. In some embodiments, the distal front outrigger 112 and the proximal front outrigger 114 are non-distinguishable, and may be adjoined at a linear feature that does not physically separate the two features.

In some embodiments, the outer struts also include a rear outrigger 140 at a proximal end of the trace gimbal 100. In some embodiments, the rear outrigger 140 includes a proximal rear outrigger 144 and a distal rear outrigger 142. In some embodiments, a length direction of the trace gimbal 100 is defined as the direction extending from the proximal end and distal end of the trace gimbal 100.

In some embodiments, the distal rear outrigger 142 and the proximal rear outrigger 144 are defined by a bend or non-linear feature of the rear outrigger 140. In some embodiments, the distal rear outrigger 142 and the proximal rear outrigger 144 are non-distinguishable, and may be adjoined at a linear feature that does not physically separate the two features.

In some embodiments, the trace gimbal 100 also includes a middle strut 120 extending in a width direction of the trace gimbal 100 (essentially in a direction orthogonal to the length direction of the trace gimbal 100 for some embodiments) and connecting the front outrigger 110 to the rear outrigger 140. In other words, the front outrigger 110 and the rear outrigger 140 adjoin at the proximal end of the middle strut 120.

In some embodiments, the trace gimbal 100 also includes an inner strut 150 extending from the slider tongue 130 and connecting the middle strut 120 to the slider tongue 130. The inner strut 150 (as well as the middle strut 120) supports the slider tongue 130 onto which a read/write head is assembled. In some embodiments, the inner strut 150 includes a distal end 152 and a proximal end 154. In some embodiments, the distal end of the middle strut 120 connects to the distal end 152 of the inner strut 150 and the proximal end 154 of the inner strut 150 connects to the slider tongue 130. In some embodiments, the inner strut 150 generally extends from the distal end of the middle strut 120 toward a proximal end of the trace gimbal 100 to connect to the slider tongue 130.

In some embodiments, the inner strut 150 includes a slot 156. In some embodiments, the slot 156 is in a central portion of the inner strut 150. In other words, the slot 156 is positioned in between the proximal end 154 and distal end 152 of the inner strut 150. In some embodiments, a cross section of the central portion including the slot 156 is larger than a cross section of the proximal end 154 and distal end 152 of the inner strut 150. In some embodiments, the width of a cross-section of the central portion including the slot 156 is larger than the width of the cross-sections of the proximal front outrigger 114, the distal front outrigger 112, and the middle strut 120. For some embodiments, the first cross-section and the second cross-section of the front outrigger is between 0.05 mm and 0.10 mm. For some embodiments, the first cross-section of the distal rear outrigger is between 0.10 mm and 0.20 mm.

In some embodiments, the slot 156 is oval-shaped extending between the proximal end 154 and distal end 152 of the inner strut 150. However, the slot 156 can include more than 1 aperture and can be other shapes and sizes. In some embodiments, the slot 156 is not symmetrically in shape. For example, the slot 156 can have a "B" shape. In some embodiments, the slot 156 can be asymmetrically located on the inner strut 150. In some embodiments, the slot 156 can include multiple holes of varying sizes and shapes and thus not necessarily round in shape.

Figure 3A:
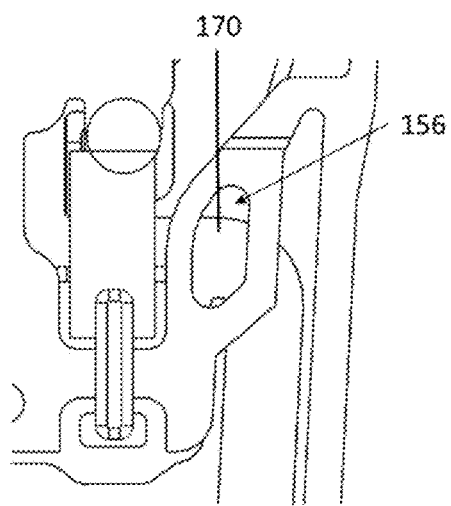
FIG. 3A illustrates a magnified view of a slot in the inner strut of a gimbal assembly of a suspension according to some embodiments of the present disclosure.

As shown in FIG. 3A, according to some embodiments, the slot 156 is partially covered by a polyimide and/or Cu layer 170. However, in some embodiments, like the exemplary structure illustrated in FIG. 3B, the slot 156 may be fully covered by the polyimide and/or Cu layer 170 for resonance improvement.

Without being bound to any particular theory, the slot 156 in the inner strut 150 enables the inner strut 150 to remain relatively rigid to in-plane bending and can maintain high yaw frequency providing improved performance over current suspensions known in the art. The slot 156 also allows the torsional stiffness of the inner strut 150 to be lowered and thus the gimbal roll stiffness can also be lowered.

Figure 4:
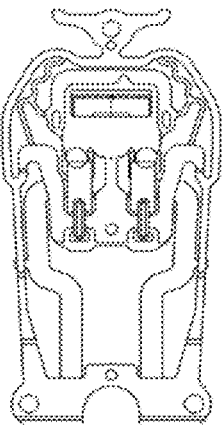
FIG. 4 illustrates a comparison of the yaw frequency and roll stiffness of a gimbal having a baseline inner strut and a gimbal having a stiffer inner strut and rear outrigger.
Figure 5:
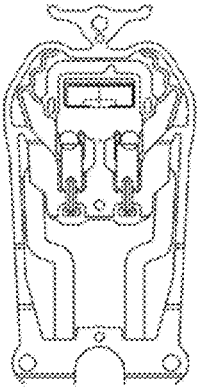
FIG. 5 illustrates a comparison of the yaw frequency and roll stiffness of a gimbal having the stiffer inner strut and rear outrigger and a gimbal according to some embodiments of the present disclosure.

As shown in FIGS. 4-5, a baseline gimbal demonstrates a roll stiffness of 0.81 uNm/deg and a yaw frequency of 55.2 kHz. A gimbal with a stiffer inner strut (as well as a stiffer rear outrigger) without a slot demonstrates a higher yaw frequency of 61.7 kHz relative to the baseline gimbal, but at the expense of a higher roll stiffness of 0.86 uNm/deg. On the other hand, according to some embodiments of the present disclosure, the roll stiffness of the gimbal 100 as described herein advantageously can be lowered relative to the gimbal with a stiffer inner strut (without a slot), while the yaw frequency can be maintained at a similar value as the gimbal with a stiffer inner strut (without a slot). For some embodiments, the roll stiffness of the gimbal 100 as described herein can be lowered from 0.86 uNm/deg to 0.82 uNm/deg, while the yaw frequency is maintained at 61.7 kHz, relative to the gimbal with a stiffer inner strut (without a slot).

Figure 2:
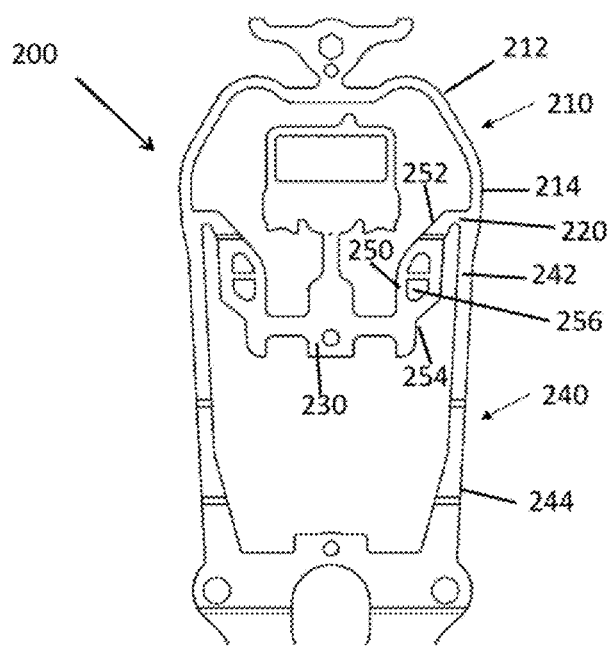
FIG. 2 illustrates a second gimbal stainless steel layer of a suspension according to some embodiments of the present disclosure.

FIG. 2 illustrates another exemplary gimbal stainless steel layer of a trace gimbal 200 of a suspension, according to some embodiments of the present disclosure.

The trace gimbal 200 includes outer gimbal struts. The outer struts include a front outrigger 210 at a distal end of the trace gimbal 200. In some embodiments, the front outrigger includes a proximal front outrigger 214 and a distal front outrigger 212. In some embodiments, the distal front outrigger 212 and the proximal front outrigger 214 are defined by a bend or non-linear feature of the front outrigger 210. In some embodiments, the distal front outrigger 212 and the proximal front outrigger 214 are non-distinguishable, and may be adjoined at a linear feature that does not physically separate the two features.

In some embodiments, the outer struts also include a rear outrigger 240 at a proximal end of the trace gimbal 200. In some embodiments, the rear outrigger 240 includes a proximal rear outrigger 244 and a distal rear outrigger 242. In some embodiments, a length direction of the trace gimbal 200 is defined as the direction extending from the proximal end and distal end of the trace gimbal 200.

In some embodiments, the distal rear outrigger 242 and the proximal rear outrigger 244 are defined by a bend or non-linear feature of the rear outrigger 240. In some embodiments, the distal rear outrigger 242 and the proximal rear outrigger 244 are non-distinguishable, and may be adjoined at a linear feature that does not physically separate the two features. For some embodiments, the first cross-section and the second cross-section of the front outrigger is between 0.05 mm and 0.10 mm. For some embodiments, the first cross-section of the distal rear outrigger is between 0.10 mm and 0.20 mm.

In some embodiments, the trace gimbal 200 also includes a middle strut 220 extending in a width direction of the trace gimbal 200 (essentially in a direction orthogonal to the length direction of the trace gimbal 200 according to some embodiments) and connecting the front outrigger 210 to the rear outrigger 240. In other words, the front outrigger 210 and the rear outrigger 240 adjoin at the proximal end of the middle strut 220. In some embodiments, the middle strut 220 includes a cross-section, which is also smaller than the cross-section of the proximal rear outrigger 244.

In some embodiments, the trace gimbal 200 also includes an inner strut 250 extending from the slider tongue 230 and connecting the middle strut 220 to the slider tongue 130. The inner strut 250 (as well as the middle strut 220) supports the slider tongue 230 onto which a read/write head is assembled. In some embodiments, the inner strut 250 includes a distal end 252 and a proximal end 254. In some embodiments, the distal end of the middle strut 220 connects to the distal end 252 of the inner strut 250 and the proximal end 254 of the inner strut 250 connects to the slider tongue 230. In some embodiments, the inner strut 250 generally extends from the distal end of the middle strut 220 toward a proximal end of the trace gimbal 200 to connect to the slider tongue 230.

In some embodiments, the inner strut 250 includes a slot 256. In some embodiments, the slot 256 is in a central portion of the inner strut 250. In other words, the slot 256 is positioned in between the proximal end 254 and distal end 252 of the inner strut 250. In some embodiments, a cross section of the central portion including the slot 256 is larger than a cross section of the proximal end 254 and distal end 252 of the inner strut 250. In some embodiments, the width of a cross-section of the central portion including the slot 256 is larger than the width of the cross-sections of the proximal front outrigger 214, the distal front outrigger 212, and the middle strut 220.

As shown in FIG. 2, in some embodiments, the slot 256 includes two apertures. In some embodiments, the slot 256, having two apertures, generally forms the shape of an "8" or a "B". However, as previously discussed with respect to FIG. 1, in some embodiments, the slot 156 is oval-shaped extending between the proximal end 152 and distal end 152 of the inner strut 150. Furthermore, in some embodiments, the slot can include one, two, or more apertures, wherein the apertures can be various shapes and sizes. In some embodiments, the slot is not symmetrically in shape. In some embodiments, the slot can be asymmetrically located on the inner strut. In some embodiments, the slot can include multiple holes of varying sizes and shapes and thus not necessarily round in shape.

In some embodiments, the slot 256 is partially covered by a polyimide and/or Cu layer similar to that described herein and as illustrated in FIG. 3A. However, in some embodiments, like the exemplary structure illustrated in FIG. 3B, the slot 256 may be fully covered by the polyimide and/or Cu layer for resonance improvement.

Without being bound to any particular theory, the slot 256 in the inner strut 250 enables the inner strut 250 to remain relatively rigid to in-plane bending and can maintain high yaw frequency. The slot 256 also allows the torsional stiffness of the inner strut 250 to be lowered and thus the gimbal roll stiffness can also be lowered.

Figure 6:
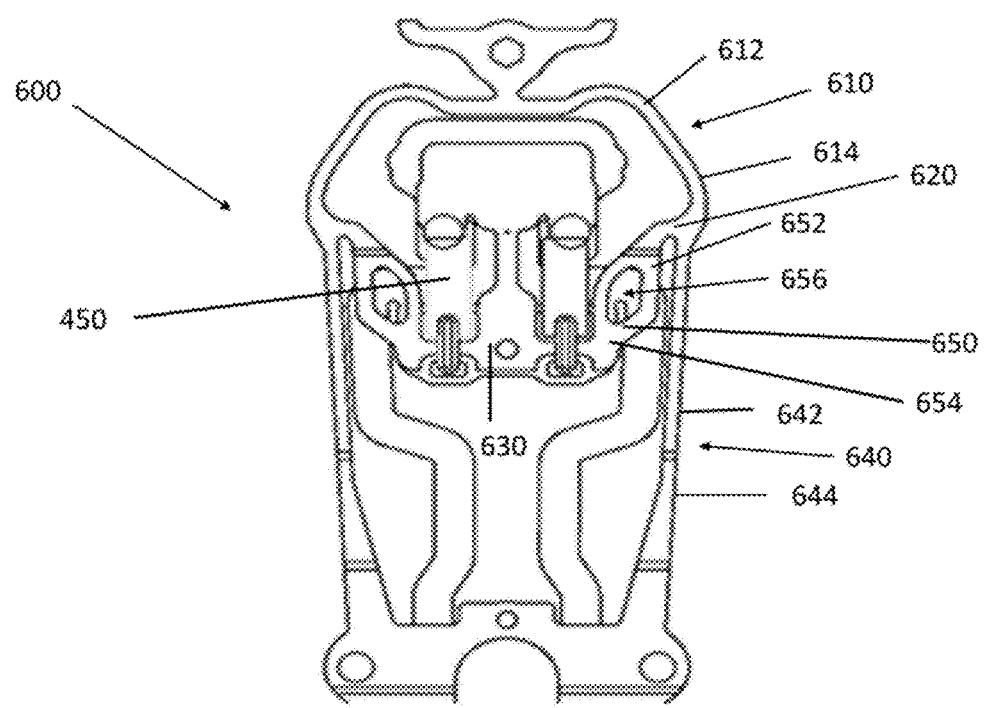
FIG. 6 illustrates a gimbal assembly of a suspension according to additional embodiments of the present disclosure.

FIG. 6 illustrates a gimbal assembly of a suspension according to additional embodiments of the present disclosure using a smaller slider form factor commonly known as uFemto. Smaller slider mass in general results in higher yaw frequency. In this embodiment, the middle strut is shortened and connected to outrigger with a larger radius region, and the inner strut is widened and results in increased yaw frequency as compared to a baseline. Specifically, FIG. 6 illustrates a trace gimbal 600, according to some embodiments of the present disclosure. The trace gimbal 600 include at least one microactuator 450 mounted on a slider tongue 630. The trace gimbal 600 includes outer gimbal struts. The outer gimbal struts include a front outrigger 610 at a distal end of the trace gimbal 600. In some embodiments, the front outrigger includes a proximal front outrigger 614 and a distal front outrigger 612. In some embodiments, the distal front outrigger 612 and the proximal front outrigger 614 are defined by a bend or non-linear feature of the front outrigger 610. In some embodiments, the distal front outrigger 612 and the proximal front outrigger 614 are non-distinguishable, and may be adjoined at a linear feature that does not physically separate the two features.

In some embodiments, the outer struts also include a rear outrigger 640 at a proximal end of the trace gimbal 600. In some embodiments, the rear outrigger 640 includes a proximal rear outrigger 644 and a distal rear outrigger 642. In some embodiments, a length direction of the trace gimbal 600 is defined as the direction extending from the proximal end and distal end of the trace gimbal 600.

In some embodiments, the distal rear outrigger 642 and the proximal rear outrigger 644 are defined by a bend or non-linear feature of the rear outrigger 640. In some embodiments, the distal rear outrigger 642 and the proximal rear outrigger 644 are non-distinguishable, and may be adjoined at a linear feature that does not physically separate the two features.

In this embodiment, the trace gimbal 600 has a shorter middle strut 620 and a wider inner strut 650 for connecting the front outrigger 610 to the rear outrigger 640. The connection of middle strut to the outrigger has a larger radius and thus making it a stiffer joint.

The inner strut 650 extends from the slider tongue 630 and connecting the outer strut to the slider tongue 630. The inner strut 650 supports the slider tongue 630 onto which a read/write head is assembled. In some embodiments, the inner strut 650 includes a distal end 652 and a proximal end 654. In some embodiments, the distal end of the inner strut 652 connects to the middle strut 620 and the proximal end of the inner strut 654 connects to the slider tongue 630. In other words, the front outrigger 610 and the rear outrigger 640 adjoin at the proximal end of a short middle strut 620.

In some embodiments, the inner strut 650 includes at least one slot 656. In some embodiments, the slot 656 is in a central portion of the inner strut 650. In other words, the slot 656 is positioned in between the proximal end 654 and distal end 652 of the inner strut 650. In some embodiments, a cross section of the central portion including the slot 656 is larger than a cross section of the proximal end 652 and distal end 652 of the inner strut 650.

In some embodiments, the width of a cross-section of the central portion including the slot 656 is larger than the width of the cross-sections of the proximal front outrigger 614, the distal front outrigger 612. For some embodiments, the first cross-section and the second cross-section of the front outrigger is between 0.05 mm and 0.10 mm. For some embodiments, the first cross-section of the distal rear outrigger is between 0.10 mm and 0.20 mm.

In some embodiments, the slot 656 is oval-shaped extending between the proximal end 652 and distal end 652 of the inner strut 650. Additionally, the slot 656 can include more than 1 aperture and can be other shapes and sizes. In some embodiments, the slot 656 is not symmetrically in shape. For example, the slot 656 can have a "B" shape. In some embodiments, the slot 656 can be asymmetrically located on the inner strut 650. In some embodiments, the slot 656 can include multiple holes of varying sizes and shapes and thus not necessarily round in shape.

Figure 3B:
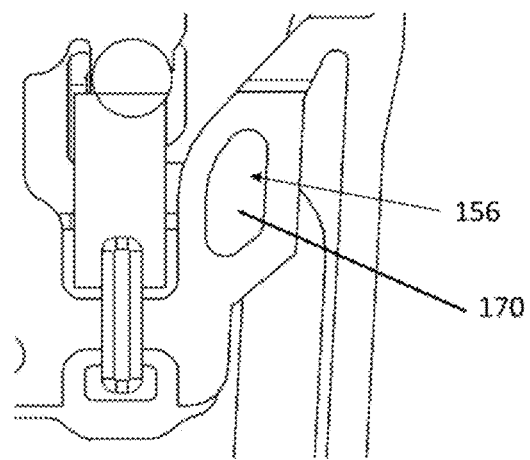
FIG. 3B illustrates a magnified view of another exemplary slot in the inner strut of a gimbal assembly of a suspension according to some embodiments of the present disclosure.

As in the previously described embodiments, the slot 656 may be partially covered by a polyimide and/or Cu layer 170; or fully covered by the polyimide and/or Cu layer 170 for resonance improvement, as shown in FIGS. 3A and 3B.

Figure 7:
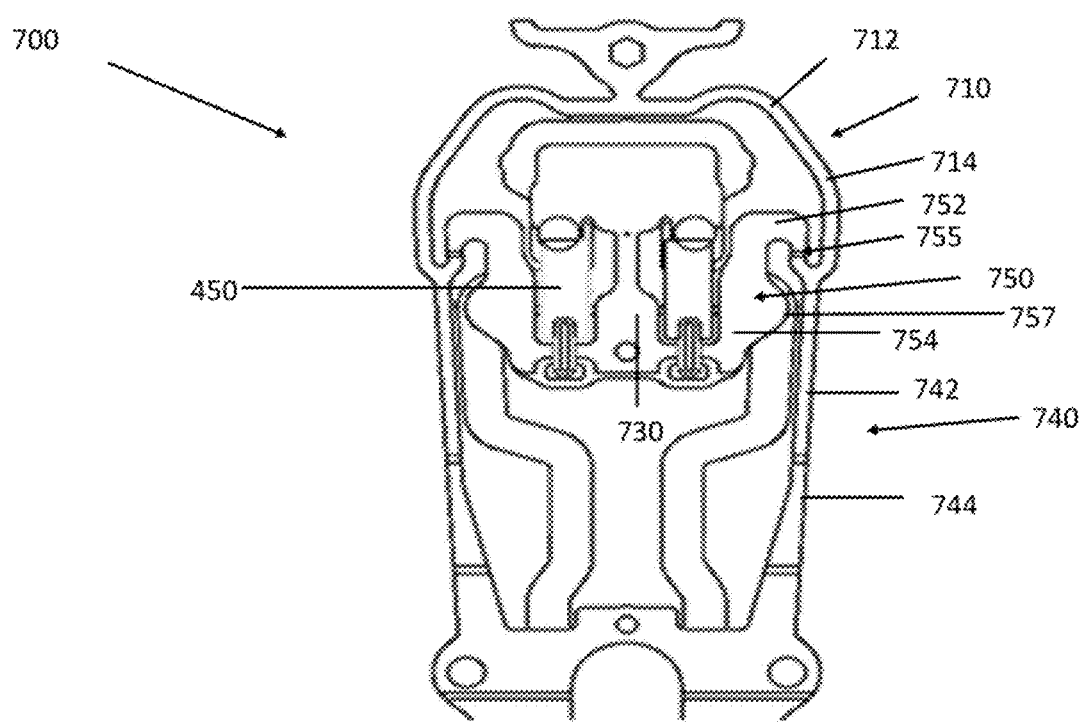
FIG. 7 illustrates a gimbal assembly of a suspension according to further embodiments of the present disclosure.

FIG. 7 illustrates a gimbal assembly of a suspension according to another embodiment of the present disclosure. In this embodiment, the middle strut is approximately parallel to the inner strut and the inner strut is widened and includes a semi-circle shaped feature at central region and does not contain a slot, as described below. This embodiment provides increased yaw frequency as compared to a baseline similarly using a smaller uFemto slider form factor.

Specifically, FIG. 7 illustrates a trace gimbal 700, according to some embodiments of the present disclosure. The trace gimbal 700 include at least one microactuator 450 mounted on a slider tongue 730. The trace gimbal 700 includes outer gimbal struts. The outer gimbal struts include a front outrigger 710 at a distal end of the trace gimbal 700. In some embodiments, the front outrigger includes a proximal front outrigger 714 and a distal front outrigger 712. In some embodiments, the distal front outrigger 712 and the proximal front outrigger 714 are defined by a bend or non-linear feature of the front outrigger 710. In some embodiments, the distal front outrigger 712 and the proximal front outrigger 714 are non-distinguishable, and may be adjoined at a linear feature that does not physically separate the two features.

In some embodiments, the outer struts also include a rear outrigger 740 at a proximal end of the trace gimbal 700. In some embodiments, the rear outrigger 740 includes a proximal rear outrigger 744 and a distal rear outrigger 742. In some embodiments, a length direction of the trace gimbal 700 is defined as the direction extending from the proximal end and distal end of the trace gimbal 700.

In some embodiments, the distal rear outrigger 742 and the proximal rear outrigger 744 are defined by a bend or non-linear feature of the rear outrigger 740. In some embodiments, the distal rear outrigger 742 and the proximal rear outrigger 744 are non-distinguishable, and may be adjoined at a linear feature that does not physically separate the two features.

In this embodiment, the trace gimbal 700 has a middle strut 755 largely in parallel with the outrigger and inner strut and connected to both outrigger and inner strut with U feature on both ends.

The inner strut 750 extends from the slider tongue 730 and connecting the middle strut 755 to the slider tongue 730. The inner strut 750 supports the slider tongue 730 onto which a read/write head is assembled. In some embodiments, the inner strut 750 includes distal end 752, a central region with a semi-circle shaped feature 757 and a proximal end 754. The semi-circle shape feature 757 overlaps with more circuit layers and provide more stiffness to the tongue to increase the yaw frequency.

Figure 8:
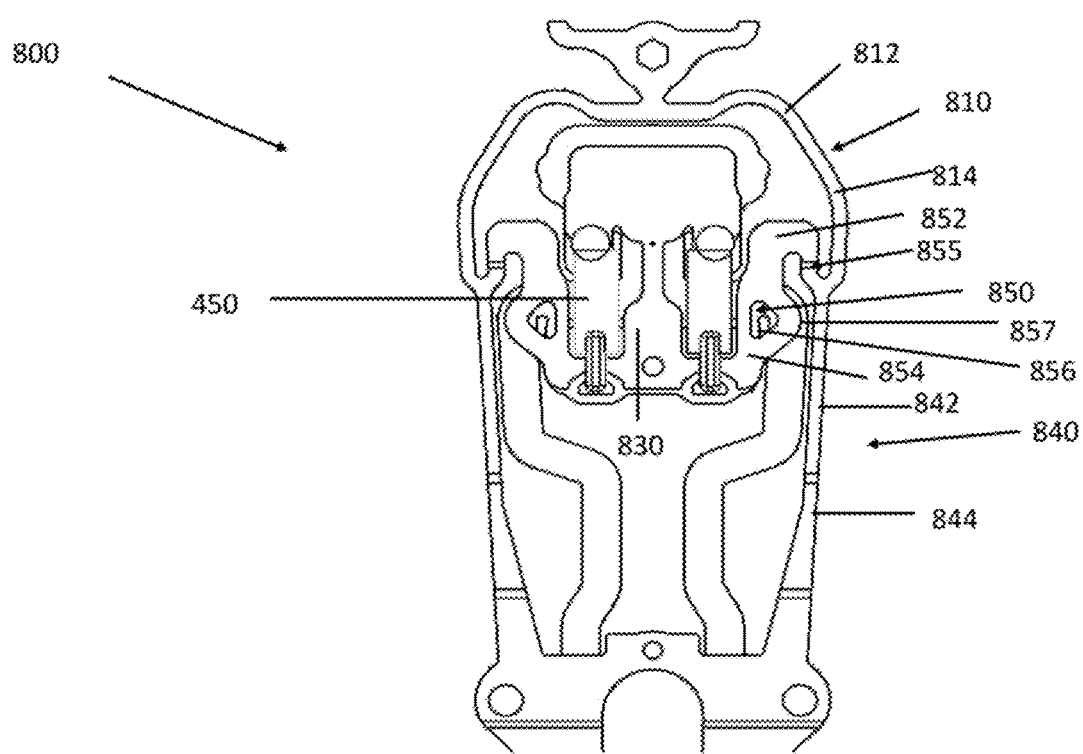
FIG. 8 illustrates a gimbal assembly of a suspension according to even further embodiments of the present disclosure.

FIG. 8 illustrates an alternative embodiment of the trace gimbal shown in FIG. 7 wherein a slot is provided in the inner strut. By adding one or more slots, wider struts and other features may be used to achieve higher yaw of the suspension, but without increasing roll stiffness.

Specifically, FIG. 8 illustrates a trace gimbal 800, according to some embodiments of the present disclosure. The trace gimbal 800 include at least one microactuator 450 mounted on a slider tongue 830. The trace gimbal 800 includes outer gimbal struts. The outer gimbal struts include a front outrigger 810 at a distal end of the trace gimbal 800. In some embodiments, the front outrigger includes a proximal front outrigger 814 and a distal front outrigger 812. In some embodiments, the distal front outrigger 812 and the proximal front outrigger 814 are defined by a bend or non-linear feature of the front outrigger 810. In some embodiments, the distal front outrigger 812 and the proximal front outrigger 814 are non-distinguishable, and may be adjoined at a linear feature that does not physically separate the two features.

In some embodiments, the outer struts also include a rear outrigger 840 at a proximal end of the trace gimbal 800. In some embodiments, the rear outrigger 840 includes a proximal rear outrigger 844 and a distal rear outrigger 842. In some embodiments, a length direction of the trace gimbal 800 is defined as the direction extending from the proximal end and distal end of the trace gimbal 800.

In some embodiments, the distal rear outrigger 842 and the proximal rear outrigger 844 are defined by a bend or non-linear feature of the rear outrigger 840. In some embodiments, the distal rear outrigger 842 and the proximal rear outrigger 844 are non-distinguishable, and may be adjoined at a linear feature that does not physically separate the two features.

In this embodiment, the trace gimbal 800 has a middle strut 855 largely in parallel with the outrigger and inner strut and connected to both outrigger and inner strut with U feature on both ends.

The inner strut 850 extends from the slider tongue 830 and connecting the middle strut 855 to the slider tongue 830. The inner strut 850 supports the slider tongue 830 onto which a read/write head is assembled. In some embodiments, the inner strut 850 includes distal end 852, a central region with a semi-circle shaped feature 857, and a proximal end 854. The semi-circle shape feature 857 overlaps with more circuit layers and provide more stiffness to the tongue to increase the yaw frequency.

In some embodiments, the inner strut 850 includes at least one slot 856. In some embodiments, the slot 856 is in a central portion of the inner strut 850. In other words, the slot 856 is positioned in between the proximal end 854 and distal end 852 of the inner strut 850. In some embodiments, a cross section of the central portion including the slot 856 is larger than a cross section of the proximal end 852 and distal end 852 of the inner strut 850. In some embodiments, the width of a cross-section of the central portion including the slot 856 is larger than the width of the cross-sections of the proximal front outrigger 814, the distal front outrigger 812. For some embodiments, the first cross-section and the second cross-section of the front outrigger is between 0.05 mm and 0.10 mm. For some embodiments, the first cross-section of the distal rear outrigger is between 0.10 mm and 0.20 mm. In some embodiments, the slot 856 is oval-shaped extending between the proximal end 852 and distal end 852 of the inner strut 850. Additionally, the slot 856 can include more than 1 aperture and can be other shapes and sizes. In some embodiments, the slot 856 is not symmetrically in shape. For example, the slot 856 can have a "B" shape. In some embodiments, the slot 856 can be asymmetrically located on the inner strut 850. In some embodiments, the slot 856 can include multiple holes of varying sizes and shapes and thus not necessarily round in shape.

As in the previously described embodiments, the slot 856 may be partially covered by a polyimide and/or Cu layer 170; or fully covered by the polyimide and/or Cu layer 170 for resonance improvement, as shown in FIGS. 3A and 3B.

FIG. 9 illustrates a comparison of the yaw frequency and roll stiffness of a gimbal having the wider inner struts according to the additional embodiments of the present disclosure. All comparisons in FIG. 9 uses small uFemto slider form factor. As shown in this example, a baseline gimbal demonstrates a roll stiffness of 0.66 uNm/deg and a yaw frequency of 62.4 kHz. When compared to the embodiments shown in FIG. 6 described herein, it is shown that shortening the middle strut and widening the inner strut results in increased yaw frequency as compared to baseline. When compared to embodiments show in FIGS. 7 and 8 described herein, it is shown that adding the semi-circular feature overlapping more area of circuit results in increased yaw frequency as compared to baseline. Moreover, the roll stiffness is not measurably increased resulting in an improved design. For some embodiments, the roll stiffness of the gimbal 600, 700 800 as described herein is maintained at 0.71 uNm/deg to 0.72 uNm/deg, while the yaw frequency is increased to between 67.8 to 76.8 kHz, relative to the baseline gimbal.

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. A trace gimbal comprising:
   outer struts including a front outrigger at a distal end of the trace gimbal and a rear outrigger at a proximal end of the trace gimbal, the front outrigger including a distal front outrigger and a proximal front outrigger, the rear outrigger including a distal rear outrigger and a proximal rear outrigger;
   a middle strut extending in a length direction of the trace gimbal and adjoining the proximal front outrigger to the rear outrigger; and
   an inner strut connecting the middle strut to a slider tongue, the inner strut comprising a first portion connecting to the middle strut, a second portion connecting to the slider tongue, and a central portion comprising a semi-circle feature extending outwardly from the inner strut such that a width of the central portion exceeds a width of the first portion and the second portion.

2. The trace gimbal of claim 1, comprising at least one microactuator mounted on the slider tongue, wherein the inner strut supports the slider tongue.

3. The trace gimbal of claim 1 wherein the inner strut includes at least one slot in a central portion of the inner strut.

4. The trace gimbal of claim 3 wherein the at least one slot is partially or fully covered by a polyimide and/or copper layer.

5. The trace gimbal of claim 1, wherein the proximal front outrigger includes a first cross-section width and the distal front outrigger includes a second cross-section width, wherein the second cross-section width is about a same dimension as the first cross-section width of the proximal front outrigger.

6. The trace gimbal of claim 5, wherein the first cross-section width and the second cross-section width of the front outrigger are between 0.05 mm and 0.10 mm.

7. The trace gimbal of claim 1, wherein the distal rear outrigger includes a first cross-section width and the proximal rear outrigger includes a second cross-section width larger than the first cross-section width.

8. The trace gimbal of claim 7, wherein the first cross-section width of the distal rear outrigger is between 0.10 mm and 0.20 mm.

9. A suspension comprising:
   a trace gimbal, the trace gimbal comprising:
   outer struts including a front outrigger at a distal end of the trace gimbal and a rear outrigger at a proximal end of the trace gimbal, the front outrigger including a distal front outrigger and a proximal front outrigger, the rear outrigger including a distal rear outrigger and a proximal rear outrigger;
   a middle strut extending in a length direction of the trace gimbal and adjoining the proximal front outrigger to the rear outrigger; and
   an inner strut connecting the middle strut to a slider tongue, the inner strut comprising a first portion connecting to the middle strut, a second portion connecting to the slider tongue, and a central portion comprising a semi-circle feature extending outwardly from the inner strut such that a width of the central portion exceeds a width of the first portion and the second portion.

10. The suspension of claim 9, further comprising at least one microactuator mounted on the slider tongue, wherein the inner strut supports the slider tongue.

11. The suspension of claim 9, wherein the proximal front outrigger includes a first cross-section width and the distal front outrigger includes a second cross-section width, wherein the second cross-section width is about a same dimension as the first cross-section width of the proximal front outrigger.

12. The suspension of claim 9, wherein the distal rear outrigger includes a first cross-section width and the proximal rear outrigger includes a second cross-section width larger than the first cross-section width.

13. The suspension of claim 9, further comprising at least one slot in a central portion of the inner strut.

14. The suspension of claim 13 wherein the at least one slot is partially or fully covered by a polyimide and/or copper layer.

* * * * *